United States Patent
Lin et al.

(10) Patent No.: US 9,846,748 B2
(45) Date of Patent: *Dec. 19, 2017

(54) SEARCHING FOR INFORMATION BASED ON GENERIC ATTRIBUTES OF THE QUERY

(71) Applicant: Alibaba Group Holding Limited, George Town (KY)

(72) Inventors: Feng Lin, Hangzhou (CN); Zhanhui Kang, Beijing (CN); Peng Huang, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

This patent is subject to a terminal disclaimer.

(21) Appl. No.: 14/958,817

(22) Filed: Dec. 3, 2015

(65) Prior Publication Data

US 2016/0085871 A1    Mar. 24, 2016

Related U.S. Application Data

(63) Continuation of application No. 14/019,427, filed on Sep. 5, 2013, now Pat. No. 9,230,025, which is a (Continued)

(30) Foreign Application Priority Data

Sep. 27, 2009 (CN) .......................... 2009 1 0175066

(51) Int. Cl.
*G06F 17/30* (2006.01)
*H04L 29/06* (2006.01)

(52) U.S. Cl.
CPC .... *G06F 17/30867* (2013.01); *G06F 17/3064* (2013.01); *G06F 17/30345* (2013.01);
(Continued)

(58) Field of Classification Search
None
See application file for complete search history.

(56) References Cited

U.S. PATENT DOCUMENTS

| 6,647,384 B2 | 11/2003 | Gilmour |
| 7,437,349 B2 | 10/2008 | Basu et al. |

(Continued)

FOREIGN PATENT DOCUMENTS

| JP | 2005149033 | 6/2005 |
| JP | 2008203933 | 9/2008 |
| WO | 2006062772 | 6/2006 |

*Primary Examiner* — Belix M Ortiz Ditren
(74) *Attorney, Agent, or Firm* — Van Pelt, Yi & James LLP

(57) ABSTRACT

Searching information includes: receiving current query data from a client; extracting generic attribute features of the current query data, wherein the generic attribute features are used for calculating a plurality of confidence degrees of the current query data that correspond to a plurality of categories, each of the confidence degrees indicating a degree of confidence that the current query data belongs to a respective one of the plurality of categories; determining the plurality of confidence degrees of the current query data based at least in part on the generic attribute features; selecting a category based at least in part on the plurality of confidence degrees, the selected category being one of the plurality of categories and having a confidence degree higher than a confidence degree of another category; searching in the selected category for a search result that corresponds to the current query data; and returning the search result.

23 Claims, 10 Drawing Sheets

Related U.S. Application Data continuation of application No. 12/807,505, filed on Sep. 7, 2010, now Pat. No. 8,560,513.

(52) U.S. Cl.
CPC .. *G06F 17/30528* (2013.01); *G06F 17/30598* (2013.01); *G06F 17/30643* (2013.01); *G06F 17/30864* (2013.01); *H04L 67/42* (2013.01)

(56) References Cited

U.S. PATENT DOCUMENTS

| | | | |
|---|---|---|---|
| 7,519,581 B2 | 4/2009 | Wang et al. | |
| 7,610,587 B2 | 10/2009 | Manuel et al. | |
| 8,145,623 B1 * | 3/2012 | Mehta | G06F 17/3064 |
| | | | 707/713 |
| 2005/0131872 A1 * | 6/2005 | Calbucci | G06F 17/30672 |
| 2005/0262058 A1 | 11/2005 | Chandrasekar et al. | |
| 2007/0112768 A1 | 5/2007 | Majumder | |
| 2007/0233650 A1 | 10/2007 | Brower et al. | |
| 2008/0016040 A1 | 1/2008 | Jones et al. | |
| 2008/0172362 A1 | 7/2008 | Shacham et al. | |
| 2009/0037398 A1 * | 2/2009 | Horvitz | G06F 17/30705 |
| 2009/0094223 A1 | 4/2009 | Berk et al. | |
| 2009/0157640 A1 | 6/2009 | Signorini et al. | |
| 2009/0228353 A1 | 9/2009 | Achan et al. | |
| 2010/0082640 A1 | 4/2010 | Wexler et al. | |

\* cited by examiner

SEARCHING FOR INFORMATION BASED ON GENERIC ATTRIBUTES OF THE QUERY

CROSS REFERENCE TO OTHER APPLICATIONS

This application is a continuation of U.S. patent application Ser. No. 14/019,427, entitled SEARCHING FOR INFORMATION BASED ON GENERIC ATTRIBUTES OF THE QUERY filed Sep. 5, 2013 which is incorporated herein by reference for all purposes, is a continuation of U.S. patent application Ser. No. 12/807,505, now U.S. Pat. No. 8,560,513, entitled SEARCHING FOR INFORMATION BASED ON GENERIC ATTRIBUTES OF THE QUERY filed Sep. 7, 2010 which is incorporated herein by reference for all purposes, which claims priority to People's Republic of China Patent Application No. 200910175066.3 entitled SEARCH METHOD AND DEVICE filed Sep. 27, 2009 which is incorporated herein by reference for all purposes.

FIELD OF THE INVENTION

The present application relates to the field of information processing and, in particular, to information search.

BACKGROUND OF THE INVENTION

Search engines are commonly used by Internet users to acquire information. One type of search engine that is used in ecommerce platforms is a category based search engine. On such a platform, the user enters query keywords, which correspond to one or more categories such as sports, entertainment, etc. The typically category based search engine can accurately narrow a search scope and recommend related products to the user so long as it is able to accurately identify a category corresponding to search keyword. Some category based search engines use a lookup table, such as a mapping table of query keywords and industry categories. An example of such a mapping table is shown in Table 1.

TABLE 1

| Query word | Category 1 | Category 2 | Category 3 |
|---|---|---|---|
| electric bike | Transportation | Sports & Entertainment | Automobiles & Motorcycles |
| ... | ... | ... | ... |

For example, if the user enters query words "electric bike", the search engine will locate the query words in the mapping table and then return three matching categories to the client, so the user can select one among the three categories and thus will search in that category of interest to him or her through the search engine and receive a search result returned from the search engine.

In category based search engines, since both the query data and the corresponding categories in the mapping table are established manually, the query words that can be processed may be limited to the number of the categories to which the query data belongs in the mapping table, and the search engine can return the search result to the user only if the query words entered by the user match the query data in the mapping table. Consequently, this search method in the prior art offers a low coverage rate of the search data. Also, since both the query data and the corresponding categories in the mapping table are established manually, the maintenance cost of the mapping table tends to be high. Further, the original mapping table has to be updated or reconstructed if any industry category is revised, thus resulting in poor expansibility.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Data search based on generic attribute features of query data is described. The generic attribute features are used for calculating confidence degrees of the current query data with respect to available categories in the data that is searched. A suitable category is chosen based on the confidence degrees and is searched to obtain results for the query.

Figure 1:
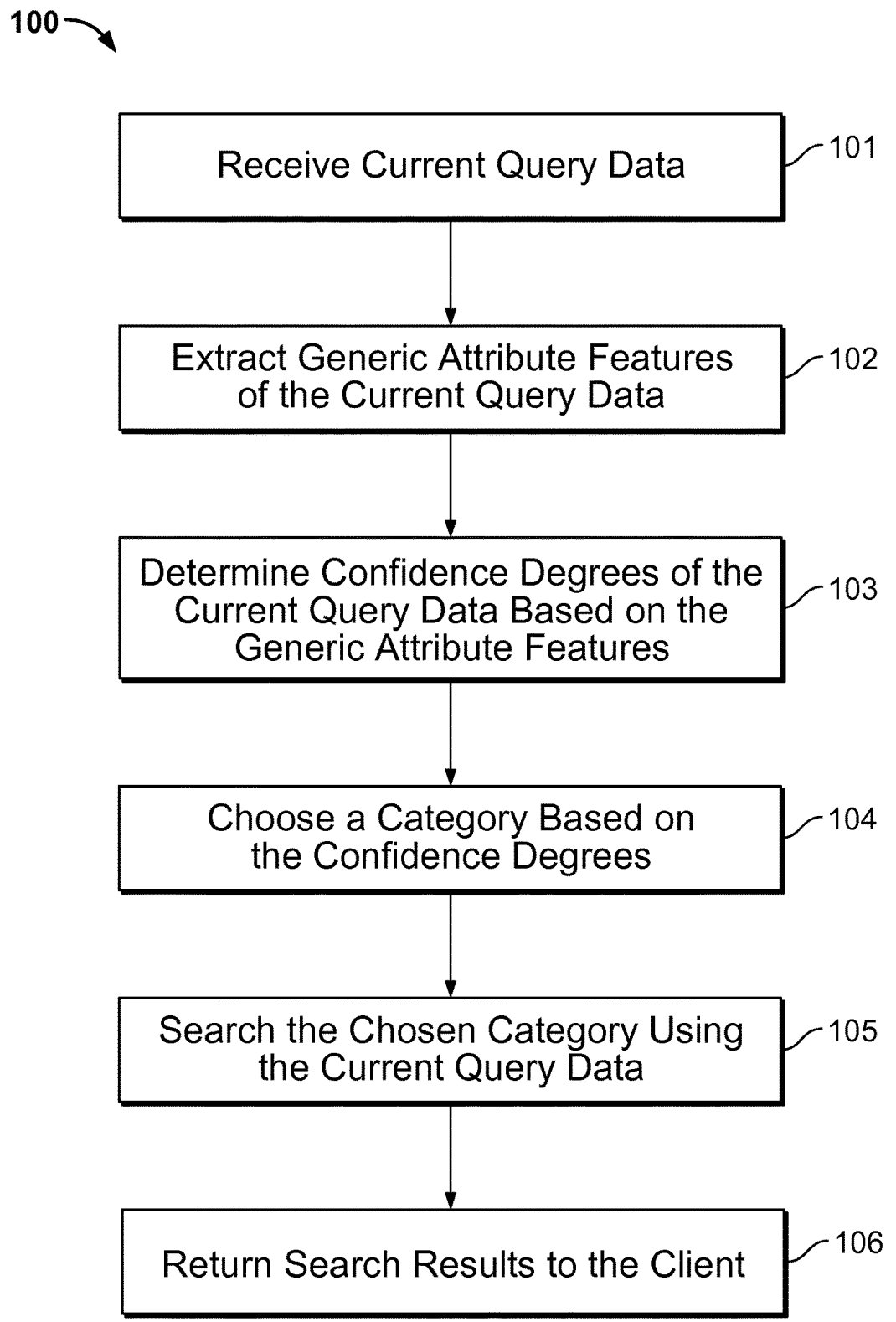
FIG. 1 is a flowchart illustrating an embodiment of a search process.

FIG. 1 is a flowchart illustrating an embodiment of a search process. Process 100 can be executed in numerous general or dedicated computing device environments or configurations, e.g., a personal computer, a server computer, a handheld or portable device, a flat panel device, a multiprocessor device, and a distributed computing environment including any of them, etc. The process can be described in a general context of computer executable instructions executed by a computer, e.g., a program module. Generally, the program module includes a routine, program, object, component, data structure, etc., for executing a specific task or implementing a specific abstract data type. The application can also be implemented in a distributed computing environment in which a task is executed by remote processing devices connected over a communication network and in which the program module can be located in a local or remote computer storage medium including a storage device.

At 101, current query data is received. In some embodiments, the current query data is submitted by a user via a browser or other appropriate user interface and is received by a category based search engine server.

At 102, generic attribute features of the current query data are extracted. The generic attribute features are used for calculating confidence degrees of the current query data with respect to various categories used by the search engine.

In various embodiments, the generic attribute features include a word-level feature, a syntax feature, a semantic feature, a click feature, a selection feature, a session feature, or a combination thereof. Other attribute features may be used in other embodiments.

As used herein, the word-level feature corresponds to a keyword in the current query data. In some embodiments, an etymon corresponding to a non-stop word is extracted as a word-level feature. For example, if the current query data is "find Nokia N95 phones", the word-level features include "find", "Nokia", "N95" and "phone." In some embodiments, a keyword of the current query data can be obtained by using known word segmentation techniques.

The syntax feature refers to an etymon corresponding to a headword in the current query data. The headword refers to the core word reflecting the main intention of the current query data. For example, in the query "find Nokia N95 phones", "phones" is the headword. An etymon corresponding to the headword in the current query data is extracted and used as the syntax feature. In the above example, the etymon "phone" is extracted as a syntax feature.

The semantic feature refers to a semantic tag corresponding to the keyword that identifies the meaning or purpose of the keyword. In some embodiments, various semantic tags includes an Action tag to identify the keyword as an action verb, a Product tag to identify the keyword as a product, a Brand tag to identify the keyword as a brand, a Model tag to identify the keyword as a model, etc. In some embodiments, an Other tag is used to identify a keyword that is neither an action, a product, a brand, nor a model. For example, for the query term "find Nokia N95 phones", corresponding semantic features include "Action: find", "Brand: Nokia", "Model: N95", and "Product: phone".

Figure 2:
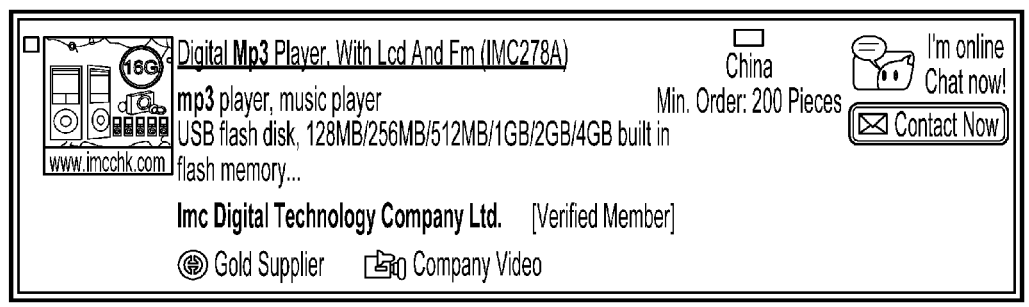
FIG. 2 is an example user interface diagram illustrating the relationship between a query term and a product.

The click feature refers to one or more clicked categories corresponding to the current query data in a preset click log, which is a database for storing the mapping of query data and the actual category/categories selected by the user. For example, the user enters a search query "mp3" and clicks on a product among results returned from the search engine, and the clicked result is related to the product has the name "Digital Mp3 Player with Lcd And Fm (IMC278A)" and belongs to the product category "MP3 player." The mapping of the search query and the product category is stored in the click log. FIG. 2 is an example user interface diagram illustrating the relationship between a query term and a product. In the example shown, "mp3" is the query term entered by the user, and the product clicked by the user belongs to the category "mp3 player" and "music player." Thus, the query term "mp3" has click features of "mp3 player" and "music player."

Figure 3:
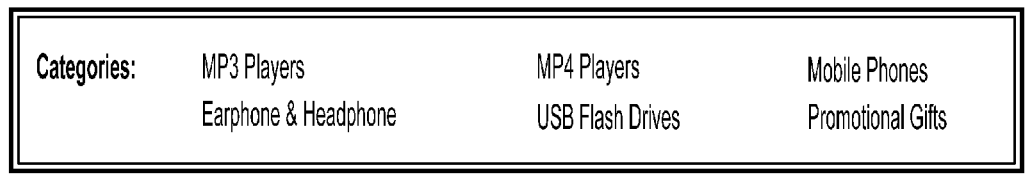
FIG. 3 is an example user interface diagram illustrating links to categories.

The selection feature refers to one or more selected categories corresponding to the current query data in a preset selection log. The selection log is used to store a correspondence relationship between the user entered query word and the clicked category. For example, if the user enters a search word "mp3" at an electronic commerce website with the URL of "www.alibaba.com", then the links to the searched products together with categories corresponding to these products are stored, so that the user can determine a search scope by clicking on the links to the categories. FIG. 3 is an example user interface diagram illustrating links to categories. In this example, the search keyword "mp3" corresponds to categories such as "MP3 Players," "Earphone & Headphone," etc. The user can access previously selected products in the categories by selecting the corresponding links.

As used herein, a series of query behaviors that take place in the same website during a specified period of time belongs to a session. The session feature refers to an optimal category corresponding to a query preceding the current query in the same session. That is, query words entered by the user after opening a webpage and before closing the webpage can be regarded as belonging to the same session. For example, a session involves three sequential queries, "phone", "Nokia phone", and "Nokia n95", so the session feature of "Nokia n95" is the best category that corresponds to the preceding query "Nokia phone." The session feature of "phone" is null since there is no preceding query.

Returning to FIG. 1, at 103, the confidence degrees of the current query data for the available categories are determined based at least in part on the generic attribute features.

In some embodiments, each feature of the current query data extracted in step 102 is regarded as a given condition in a conditional probability model. In the conditional probability model, the confidence degree takes on a value ranging from 0 to 1 to represent the probability that an event occurs under the given condition. Since a conditional probability refers to a probability that an event occurs on the precondition that another event (condition) occurs, the word-level feature, the syntax feature, the semantic feature, the click feature, the selection feature and the session feature of the current query data is each regarded as a condition, and the confidence degree calculated for a category is considered to be a probability that the current query data belongs to that category. The larger the value of the confidence degree, the more probably the current query data belongs to a corresponding category.

In some embodiments, a corresponding confidence degree is calculated for a specific category using a maximum entropy technique. The confidence degrees are sometimes calculated for respective categories using a machine learning technique in some embodiments to utilize training query data with a certain scale to simulate a query of the user and determine a probability that the query data is categorized. For example, for a word-level feature, if there is a record indicating that "a query including 'phone' belongs to the electronics category" in the training data, then for the word-level feature "phone" in the current query data, the word-level feature takes a corresponding value of 1 when a confidence degree is calculated for the electronics category and 0 when a confidence degree is calculated for a category other than the electronics category. Likewise, values corresponding to the word-level feature, the syntax feature, the semantic feature, the click feature, the selection feature, and the session feature in the current query data can be calculated respectively according to the contents in the training data, and upon presence of these feature values, a probability that the current query data belongs to a category can be calculated according to the conditional probability model.

At 104, a category is chosen among the available categories based at least in part on the confidence degrees. The chosen category can be chosen in a variety of ways. In some embodiments, a subset of several categories with high confidence degrees is sent. For example, assuming that there are 40 available categories and 40 corresponding confidence degrees are calculated and sorted. The search engine server returns to the user the respective categories and the corresponding confidence degrees to the user or, alternatively, returns the top 10 categories with the highest confidence degrees to the user, so that the user can manually determine a search scope according to a category of interest to him or her for more precise search of information on a product as needed. In some embodiments, the server compares the confidence degrees and automatically selects the category that has the highest confidence degree.

At 105, the chosen category is searched using the current query data, and the search results are returned to the client at 106.

The search engine server is notified of the chosen category and searches in the scope of the chosen category for information related to the current query data. In some embodiments, features are extracted from the current query data submitted from the client, where the features relate to a word-level feature, a syntax feature, a semantic feature, a click feature, a selection feature, and a session feature of the current query data, and these features are matched in the training data to thereby acquire feature values indicating match results. Confidence degrees indicating that the current query data belongs to respective categories are calculated from the feature values according to the conditional probability model and are used for choosing an appropriate category for searching for the query data. Thus, the operation efficiency and performance of the search engine server are improved, as well as the accuracy of the search results.

Figure 4:
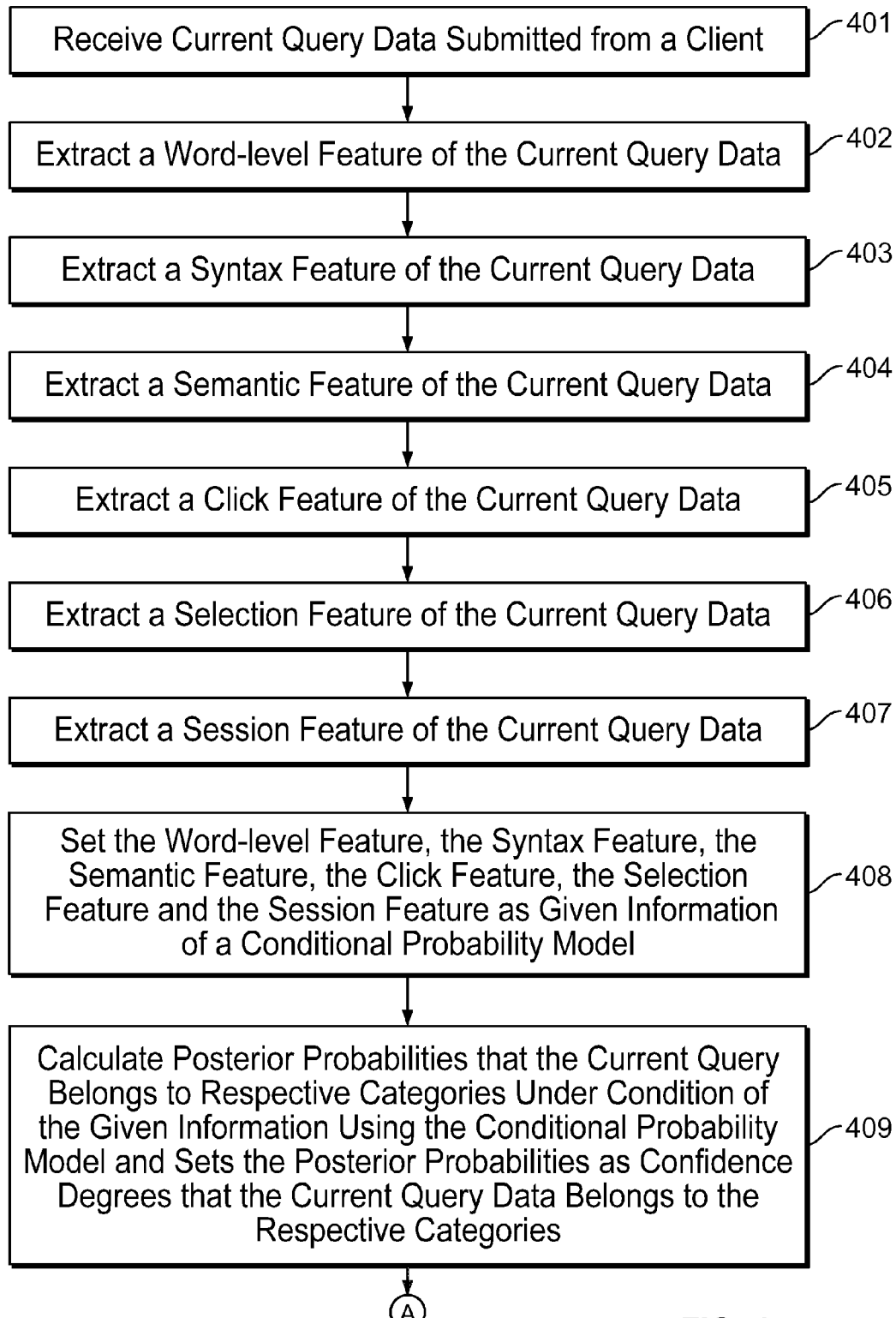
FIG. 4 is a flowchart illustrating another embodiment of a search process.
Figure 4:
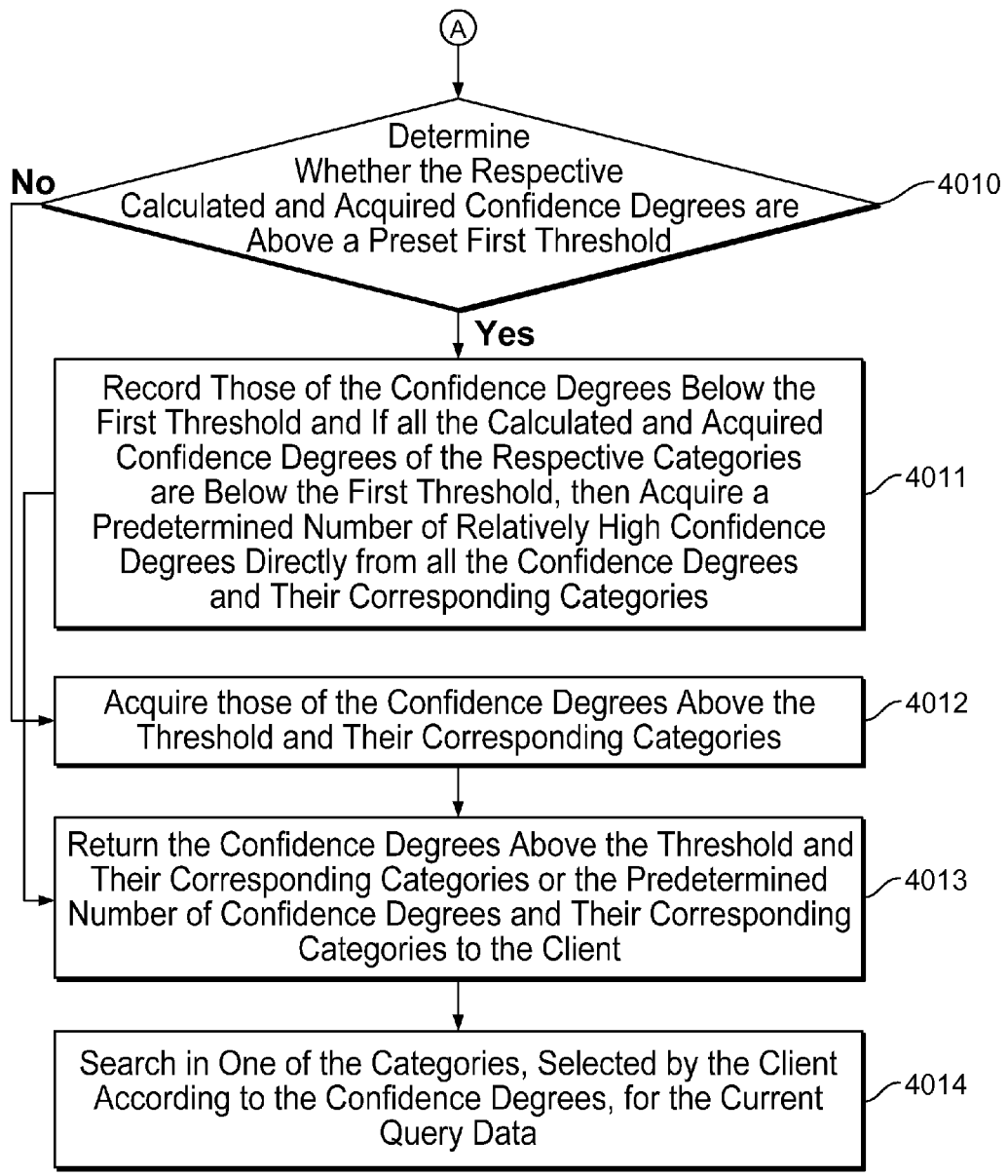

FIG. 4 is a flowchart illustrating another embodiment of a search process.

At 401, a query categorizer receives current query data. In the present embodiment, the query categorizer is used to extract related features of the current query data and to calculate confidence degrees corresponding to categories for the extracted features. The query categorizer can be implemented in software or hardware, and can be added as an additional feature of a search engine server or as a separate entity connected with the search engine server.

At 402, the query categorizer extracts a word-level feature of the current query data. Example techniques of how to extract a word-level feature was described above.

At 403, the query categorizer extracts a syntax feature of the current query data. In the present embodiment, parts-of-speech of respective words of the current query data are first tagged using a part-of-speech tagging tool. For example, the part-of-speech of "phones" is nns, which indicates that the word is a plural noun. Next, a phrase of the current query data is identified using a phrase identification tool. For example, the current query data "find Nokia N95 phones" includes two phrases, i.e., a verb phrase "find" and a noun phrase "Nokia N95 phones" respectively. The headword (such as "phones") is then extracted from the noun phrase according to a rule. For example, a rule may specify that "if a query word includes only one noun phrase, then the last noun in the noun phrase is a headword." Finally, the etymon "phone" of "phones" is extracted using an etymon extraction tool. Standard or specialized part-of-speech tagging tool, phrase identification tool, and etymon extraction tool are used in some embodiments.

At 404, the query categorizer extracts a semantic feature of the current query data. In this example, a list of brand names (e.g., "Nokia"), a list of model names (e.g., "N95"), and a list of base product names (e.g., "phone"), are generated from product information published over an electronic commerce network based upon a query log stored in the search engine server. Thus, the query categorizer tags a brand, a model, a product name, etc., contained in keywords of the current query data according to the foregoing respective list and extracts the etymons of the keywords as a semantic feature.

At 405, the query categorizer extracts a click feature of the current query data. In some embodiments, the query categorizer acquires a corresponding click feature directly from a preset click log according to a correspondence relationship between the current query data and the click feature. In some implementations, different products may relate to information in the same category, and the user also may click on webpage links corresponding to the plurality of products for the same query word, so the same query word may corresponding to a plurality of categories in the click log. The search engine server records the user entered query words and the webpage links of those products on which that the user clicks among products recommended from the search engine to record the different categories to which these products belong, thus establishing correspondence relationships between the query word and the categories and creating the click log based on the query word, the categories and the correspondence relationships.

In some embodiments, initially the first n most frequent categories (n is preferably set to 3 in some embodiments) corresponding to the current query data in the preset click log are acquired from the click log as click features. If the current query data does not have a match in the click log, then a query closest to the current query data is located in the click log, and the first n most frequent categories corresponding to the closest query in the click log are determined as click features of the current query data. Query data at the minimum edit distance from the current query data is located in the click log as the closest query. The edit distance refers to a cost of operations at which operations of insertion, deletion, modification, etc. are performed on the two pieces of query data to make them identical. The edit cost is directly proportional to the edit distance.

At 406, the query categorizer extracts a selection feature of the current query data. In some embodiments, the query categorizer acquires a corresponding selection feature directly from a preset selection log according to a correspondence relationship between the current query data and the selection feature. In some implementations, the search engine can also recommend for the same query word a plurality of categories according to a mapping table, such that the same query word may correspond to the plurality of categories in the selection log. Accordingly, the search engine server can create the selection log based on the categories recorded in the mapping table and correspondence relationship between the categories and the query word.

In some embodiments, initially the first n most frequent categories (n is preferably 3) corresponding to a query in the preset selection log are acquired from the selection log as selection features. If the current query data is absent in the selection log, then a query closest to the current query data is located in the selection log, and the first n most frequent categories corresponding to the closest query in the selection log are determined as selection features of the query. Query data at the minimum edit distance from the current query data is located as the closest query.

At 407, the query categorizer extracts a session feature of the current query data. In the field of electronic commerce, a session is typically conducted about the same subject. Categories to which query data in the same session belongs are typically identical or related. In practice, for example, a session involves three sequential queries, i.e., "phone", "Nokia phone" and "Nokia n95," all of which reflect the query intentions of the user and categories to which the three queries belong are related. Therefore, the session feature can also reflect to some extent a degree of confidence that the current query data belongs to a category.

At 408, the query categorizer sets the word-level feature, the syntax feature, the semantic feature, the click feature, the selection feature, and the session feature as given information of a conditional probability model.

For any given category C, a confidence degree that the current query data corresponds to the category C can be represented as a posterior probability p (expressed as: c is the correct category|x) that the current query data is determined to belong to the category C under condition of given related information x, where x represents the given information, i.e., the word-level feature, the syntax feature, the semantic feature, the click feature, the selection feature, and the session feature in the present embodiment.

At 409, the query categorizer calculates posterior probabilities that the current query belongs to the respective categories under the condition of the given information using the conditional probability model and sets the posterior probabilities as confidence degrees that the current query data belongs to the respective categories.

The conditional probability model can train the weights of the features obtained by the current query data and the conditional probabilities (i.e., confidence degrees) that the current query data is determined to belong to the respective categories are calculated from the obtained corresponding feature values and weights using the conditional probability model.

A maximum entropy model defined using the following equation is used as the conditional probability model in some embodiments:

$$p(y|x) = \frac{1}{Z(x)} \exp\left(\sum_j \lambda_j f_j(x, y)\right) \quad (1)$$

Where y∈{c is the correct category, c is an incorrect category}; x is the given information corresponding to the current query data, i.e., the word-level feature, the syntax feature, the semantic feature, the click feature, the selection feature, and the session feature in the present embodiment; $f_j$ is a feature value corresponding to the maximum entropy model, for example, when x is the word-level feature, if the training data indicates that "when a keyword of the current query data includes 'phone', the category is C," then the feature $f_j$ has the value of 1 on the condition that "the keyword of the current query data includes 'phone'"; else, or $f_j$ has the value of 0. $\lambda_j$ is a weight corresponding to a feature of the current query data, which can be obtained through model training; and Z(x) is a normalization factor which can also be obtained through model training.

In practice, the conditional probability model can be created using a machine learning techniques such as linear regression. In some embodiments, a support vector machine model can also be adopted for calculating a score for use as a confidence degree; however, the support vector machine model is not considered to be a conditional probability model by some.

At 4010, the query categorizer determines whether the respective calculated and acquired confidence degrees are above a preset first threshold and if so, then the flow goes to 4012; otherwise, the flow goes to 4011.

After calculating and acquiring the confidence degrees that the current query data belongs to the respective categories, the query categorizer can preset a first threshold. For example, if the threshold is set to be 0.5, then a category with a corresponding confidence degree above 0.5 is regarded as the category with a high degree of confidence.

At 4011, those of the confidence degrees below the first threshold are recorded. If all the calculated and acquired confidence degrees of the respective categories are below the first threshold, then a predetermined number of relatively high confidence degrees are acquired directly from all the confidence degrees and their corresponding categories, and the flow goes to the 4013.

At the end of determination for all the confidence degrees, if none of the confidence degrees corresponding to the respective categories is above the first threshold, then the query categorizer can sort directly all the confidence degrees in a descending order and acquire a first predetermined number of relatively high confidence degrees and their corresponding categories.

At 4012, the query categorizer acquires those of the confidence degrees above the threshold and their corresponding categories.

At 4013, the query categorizer returns the confidence degrees above the threshold and their corresponding categories or the predetermined number of confidence degrees and their corresponding categories to the client.

In some embodiments, the query categorizer returns all the confidence degrees above the first threshold and their corresponding categories to the client and also presents them in an order of descending confidence degrees; alternatively, the query categorizer presents the first predetermined number (e.g., 8) of confidence degrees and their corresponding categories on the client.

At 4014, the query categorizer searches in one of the categories, selected by the client according to the confidence degrees, for the current query data.

In the present embodiment, existing tools such as standard word segmentation unit, part-of-speech tagging tool, etc., can be used. A high coverage rate thereof can be gained in a machine learning method based upon a conditional probability because confidence degrees of respective possible related categories can be obtained from various extracted features using a conditional probability model regardless of whether the current query data has ever occurred, thus achieving wider applications and improved accuracy.

Figure 5:
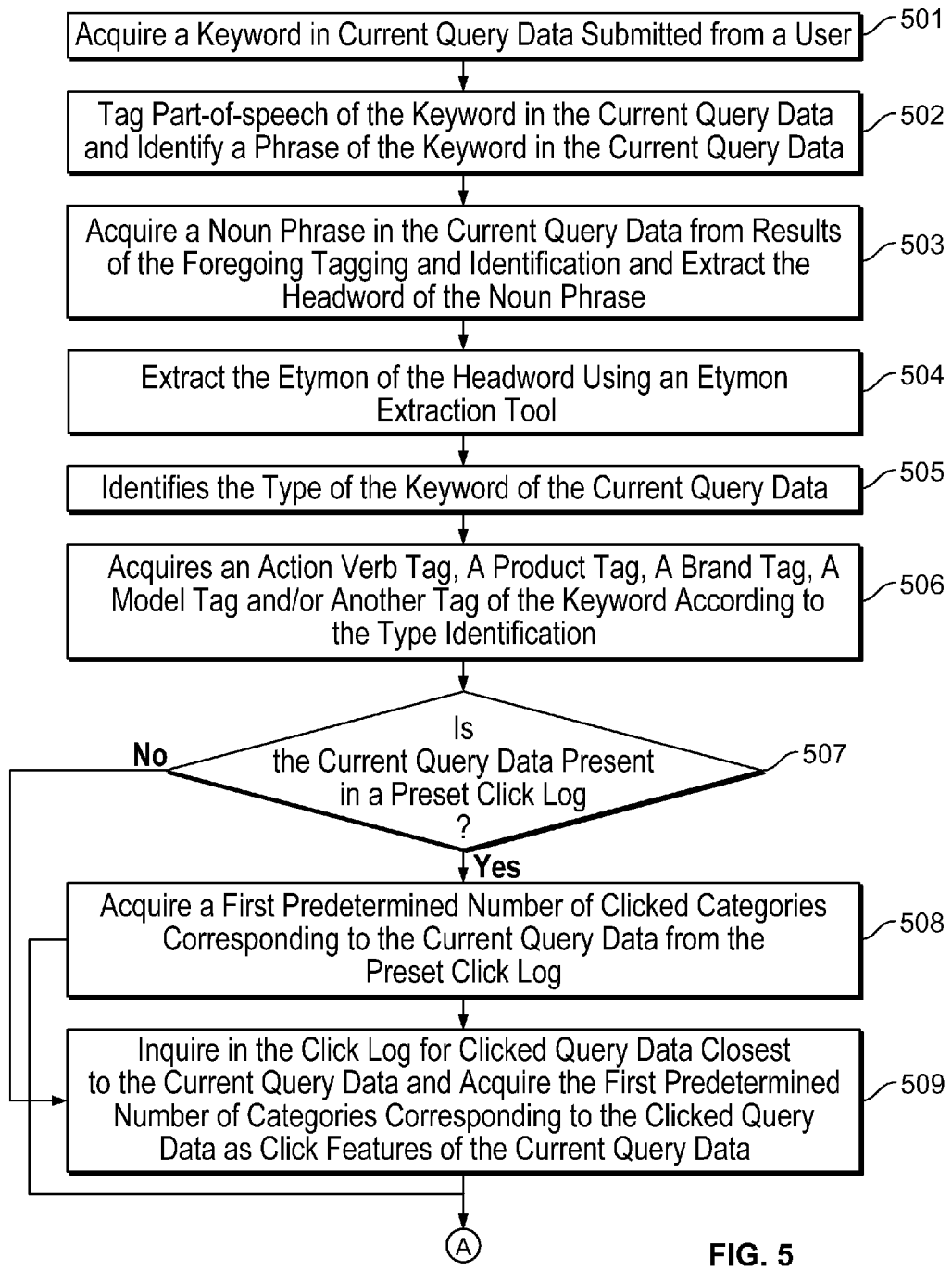
FIG. 5 is a flowchart illustrating another embodiment of the search application.
Figure 5:
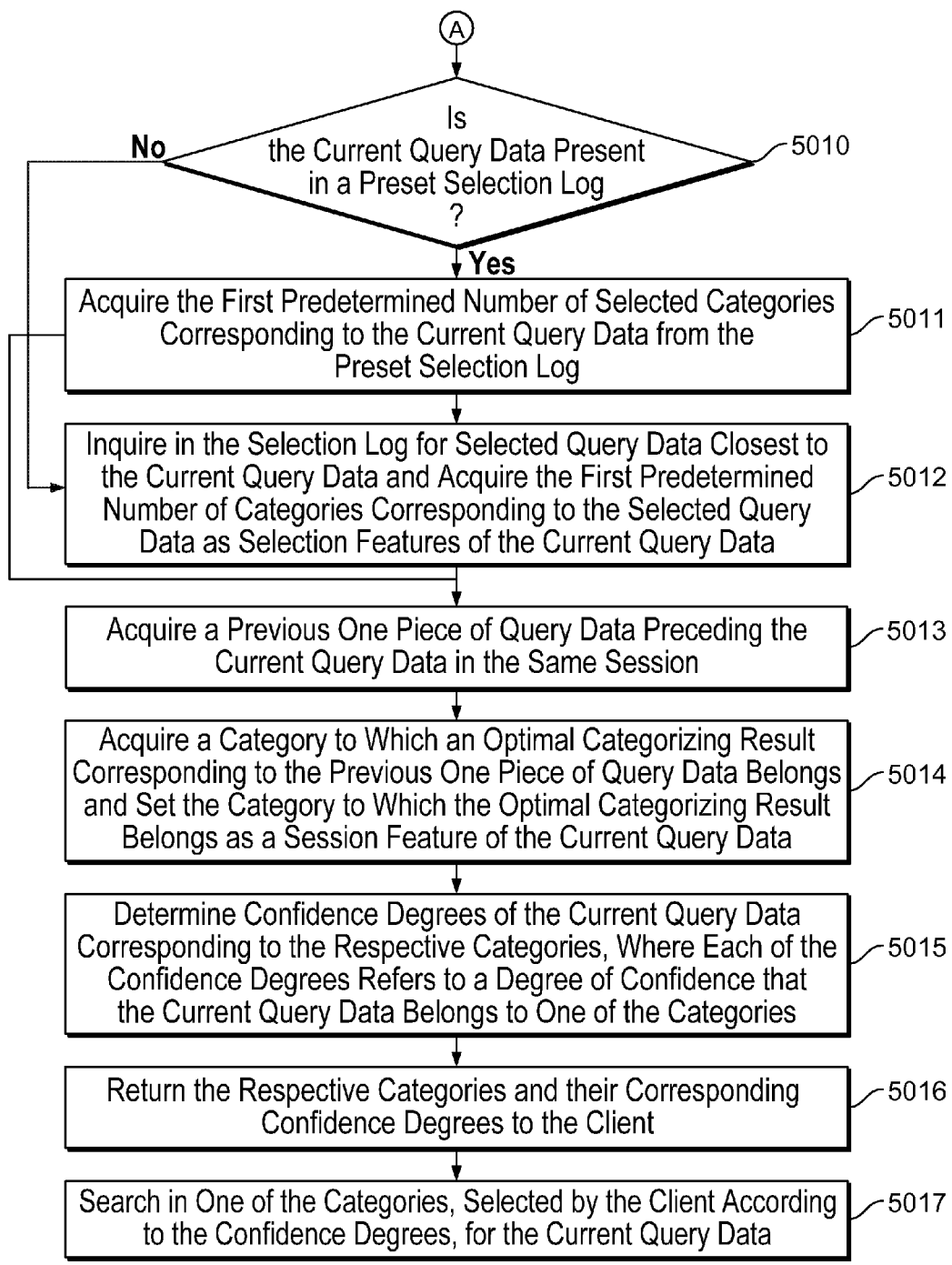

FIG. 5 is a flowchart illustrating another embodiment of the search application.

At 501, a query categorizer acquires a keyword in current query data. The query categorizer in the present embodiment is integrated with a word segmentation unit with which a keyword in the current query data is obtained. For example, given that the current query data is "find Nokia N95 phones," for a category C, if the confidence function $f(x, y)$ is 1 on the conditions "the current query word corresponds to the category C and includes 'find'", "the current query word corresponds to the category C and includes 'Nokia'", and "the current query word corresponds to the category C and includes 'N95'", and otherwise $f(x, y)$ is 0, then f(x=find, "find Nokia N95 phones"∈category C) has a value of 1 when a word-level feature of "find" is extracted from "find Nokia N95 phones." Similarly, f(x=Nokia, "find Nokia N95 phones"∈category C) and f(x=N95, "find Nokia N95 phones"∈category C) also have values of 1, while f(x=phone, "find Nokia N95 phones"∈category C) has a value of 0.

At 502, the query categorizer tags the part-of-speech of the keyword in the current query data and identifies a phrase of the keyword in the current query data.

The query categorizer in the present embodiment is integrated with a part-of-speech tagging tool, a phrase identification tool and an etymon extraction tool. A part-of-speech of each keyword is tagged using the part-of-speech tagging tool, for example, when the current query data is "find Nokia N95 phones", the part-of-speech of the keyword "phones" is nns, which indicates that the word is a plural noun, and the current query data includes the verb phrase "find" and the noun phrase "Nokia N95 phones".

At 503, the query categorizer acquires the noun phrase in the current query data from results of the foregoing tagging and identification and extracts the headword of the noun phrase. In this example, the query categorizer extracts the headword "phones" from the noun phrase "Nokia N95 phones".

At 504, the query categorizer extracts the etymon of the headword using the etymon extraction tool. In this example, the etymon "phone" of "phones" is extracted using the etymon extraction tool.

502-504 described in the present embodiment are used to extract a syntax feature of the current query data. For "find Nokia N95 phones", if the data belonging to the category C can be matched in the training data when the syntax feature is "phone", then the syntax feature of "find Nokia N95 phones" has a value of 1; otherwise it has a value of 0. The current query word corresponds to the category C and the headword of the query word includes the etymon "phone." Accordingly, f(x=phone, "find Nokia N95 phones"∈category C) takes a value of 1 for calculating a confidence degree of the category C or takes a value of 0 otherwise.

At 505, the query categorizer identifies the types of the keywords of the current query data. That is, the respective keywords of the current query data are tagged with a type, for example, "find" is tagged as an action verb, "Nokia" is tagged as a brand name, etc.

At 506, the query categorizer acquires an action verb tag, a product tag, a brand tag, a model tag and/or another tag of the keywords according to the type identification. For the query "find Nokia N95 phones", four semantic features in total are acquired, i.e., "Action: find", "Brand: Nokia", "Model: N95" and "Product: phone."

505-506 are used to acquire the semantic feature of the current query data.

At 507, the query categorizer determines whether the current query data is present in a preset click log, where the preset click log is adapted to store a correspondence relationship between the query data and a click feature. If so, the flow goes to 508; otherwise, the flow goes to 509.

As discussed above, the search engine server can return a plurality of links to a product related to the current query data in response to the user entered current query data. Particularly, the click log records those links to the product on which the user clicks after entering the query word as well as categories to which the product belongs. Particularly, the click log can further include information on a product title, a product keyword, etc.

At 508, a first predetermined number of clicked categories corresponding to the current query data are acquired from the preset click log, where the clicked categories are categories to which the corresponding product clicked on by the user after searching for the query data belongs.

For example, the current query data is "find Nokia N95 phones", and corresponding click features include "Click_Category_Top1: telecommunications", "Click_Category_Top2: consumer electronics", and "Click_Category_Top3: computer hardware & software", where Topi (i=1, 2, 3) identifies the first $i^{th}$ clicked category to which the click feature belongs and Click_Category represents a clicked category.

At 509, the query categorizer inquires in the click log about clicked query data closest to the current query data, where the clicked query data is at the shortest edit distance in the click log from the current query data. The query categorizer also acquires a first predetermined number of categories corresponding to the clicked query data as click features of the current query data.

507-509 are used to extract the click feature of the current query data.

At 5010, the query categorizer determines whether the current query data is present in a preset selection log, where the selection log is adapted to store a correspondence relationship between the query data and a selection feature. If so, the flow goes to 5011; otherwise, the flow goes to 5012.

At 5011, the query categorizer acquires a first predetermined number of selected categories corresponding to the current query data from the preset selection log, where the selected categories represent categories associated with the current query data in a mapping table of the search engine.

At 5012, the query categorizer inquires in the selection log about selected query data closest to the current query data, where the selected query data is at the shortest edit distance in the selection log from the current query data, and acquires a first predetermined number of categories corresponding to the selected query data as selection features of the current query data.

5010-5012 are used to extract the selection feature of the current query data.

At 5013, the query categorizer acquires query data preceding the current query data in the same session. In the present example, the query categorizer inquires about the query data preceding "find Nokia N95 phones".

At 5014, the query categorizer acquires a category to which an optimal categorizing result corresponding to the previous one piece of query data belongs and sets the category to which the optimal categorizing result belongs as a session feature of the current query data. For example, assume that the user has entered three queries $q_1$, $q_2$, and $q_3$.

The query categorizer determines an optimal category $c_1$ corresponding to $q_1$. When the query categorizer processes $q_2$, a corresponding session feature is that the optimal categorizing result corresponding to the preceding query data belongs the category $c_1$.

At 5015, the query categorizer calculates and acquires confidence degrees of the current query data corresponding to the respective categories according to the word-level features, the syntax feature, the semantic features, the click features, the selection features, and the session feature, where each of the confidence degrees refers to a degree of confidence that the current query data belongs to one of the categories.

In a specific example, it is assumed in the present embodiment that the word-level features of the current query data has values of 1, 1, 1, and 0 respectively, the syntax features have values of 1 and 0 respectively, the semantic features have values of 1, 1, 1, 0, and 0 respectively, the click features have values of 0, 0, and 1 respectively, the selection features have values of 1, 0, and 1 respectively, and the session feature has a value of 1. The values of confidence degrees corresponding to the respective categories can be derived in the following equation of a maximum entropy model:

$$p(y|x) = \frac{1}{Z(x)} \exp\left(\sum_j \lambda_j f_j(x, y)\right)$$

At 5016, the query categorizer returns the respective categories and their corresponding confidence degrees to the client.

The query categorizer sorts correspondence relationships between the corresponding categories and the confidence degrees in descending order of confidence degrees after calculating the confidence degrees and thereby returns them to the client.

At 5017, the search engine server searches in one of the categories, selected by the client according to the confidence degrees, for the current query data.

Figure 6:
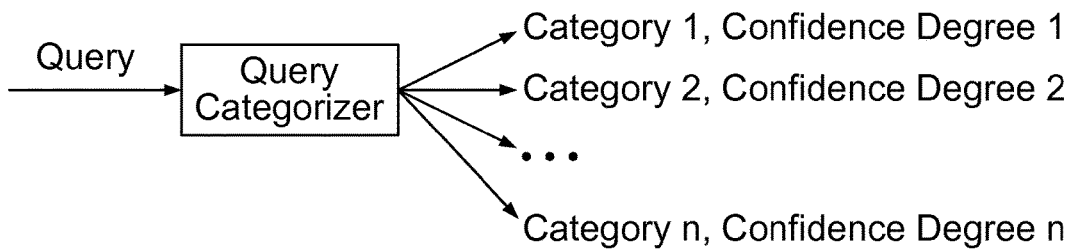
FIG. 6 is a block diagram illustrating the inputs and outputs of the query categorizer.

As can be seen from the examples above, the search categorizer can exist separately from the search engine server and can be integrated on the search engine server when a search system in a practical application categorizes a query. FIG. 6 is a block diagram illustrating the inputs and outputs of the query categorizer.

Figure 7:
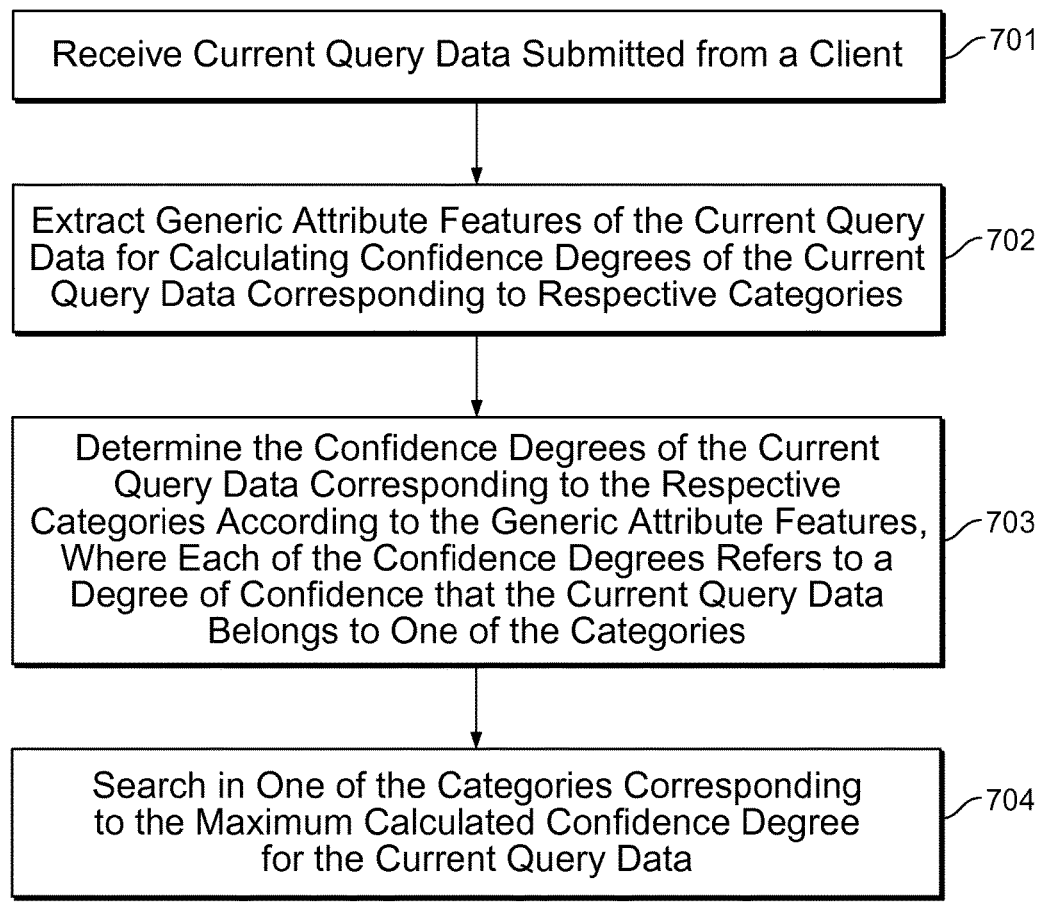
FIG. 7 is a flowchart illustrating another embodiment of the search method according to the application.

FIG. 7 is a flowchart illustrating another embodiment of the search method according to the application.

At 701, current query data submitted from a client is received.

At 702, generic attribute features of the current query data are extracted for calculating a confidence degree of the current query data.

At 703, confidence degrees of the current query data corresponding to respective categories are calculated and acquired according to the generic attribute features, where each of the confidence degrees refers to a degree of confidence that the current query data belongs to one of the categories.

In the present embodiment, 701-703 can be similar to the corresponding operations described above.

At 704, a search for the current query data is performed in a category that the maximum calculated confidence degree among the available categories.

In the present embodiment, the search engine server makes an automatic selection of the category with the maximum confidence degree and then searches directly in that category for the current query data. A search result is returned to the user. Here, the search engine server not only performs a search according to the maximum confidence degree but also selects a category corresponding to a specific confidence degree or categories corresponding to a plurality of confidence degrees satisfying a specific condition as the scope in which to search for the current query data and some variations which can be made to the solution by those skilled in the art will also come into the scope of the invention.

The method according to the present embodiment can perform a search directly according to an optimal result instead of returning the confidence degrees and their corresponding categories to the user, so that a demand of the user for a search result can generally be satisfied without storing any corresponding mapping table. Regardless of whether the current query data of the user has ever occurred in the past, the maximum confidence degree that the current query data belongs to a category can be determined and a search is performed in the category deemed as the most reasonable search operations, so that a coverage rate of the query data can be improved without transmitting category and confidence degree data from the search engine to the client. Thus, bandwidth is conserved and the server's communication burden is reduced.

Figure 8:
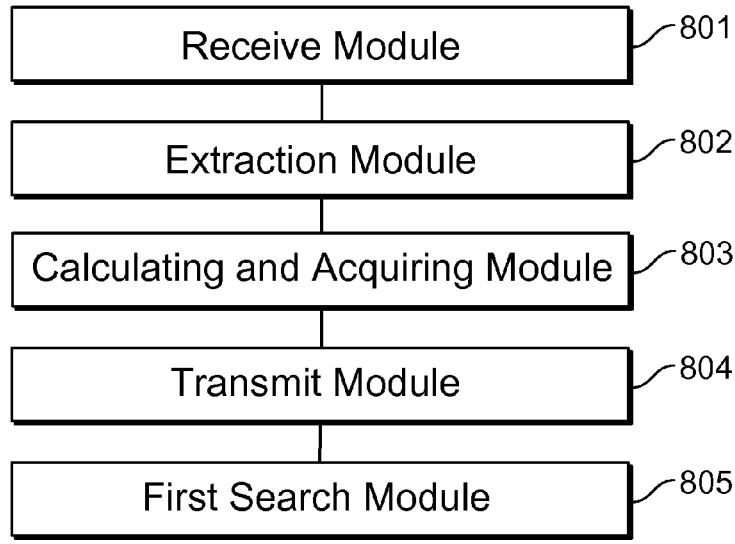
FIG. 8 is a block diagram illustrating an embodiment of a search system.

FIG. 8 is a block diagram illustrating an embodiment of a search system. System 800 may be implemented using one or more computing devices such as a personal computer, a server computer, a handheld or portable device, a flat panel device, a multi-processor system, a microprocessor based system, a set-top box, a programmable consumer electronic device, a network PC, a minicomputer, a large-scale computer, a special purpose device, a distributed computing environment including any of the foregoing systems or devices, or other hardware/software/firmware combination that includes one or more processors, and memory coupled to the processors and configured to provide the processors with instructions.

A receiving module 801 is adapted to receive current query data submitted from a client.

An extraction module 802 is adapted to extract generic attribute features of the current query data, where the generic attribute features are used for calculating confidence degrees of the current query data corresponding to respective categories.

In an embodiment of the application, some features of the current query data are extracted for subsequent operation of conditional probabilities, and generic attribute features are required to be extracted from the current query data and preferably include word-level features, syntax features, semantic features, click features, selection features, and session features as described above.

A calculating and acquiring module 803 is adapted to calculate and acquire confidence degrees of the current query data corresponding to the respective categories according to the generic attribute features, where each of the confidence degrees refers to a degree of confidence that the current query data belongs to one of the categories.

Particularly, the extracted features of the current query data each can be regarded as a given condition in a conditional probability model and the confidence degree takes a value ranging from 0 to 1 to represent a probability that an event occurs on the given condition. Since a conditional probability refers to a probability that an event occurs on the precondition that another event (condition) occurs, the word-level feature, the syntax feature, the semantic feature, the click feature, the selection feature and the session feature of the current query data in the present embodiment each is regarded as a condition, and the confidence degree calculated for a category can be considered as a probability that the current query data belongs to that category. As can be seen, the greater the confidence degree is, the more probable the current query data belongs to a corresponding category.

Preferably, a corresponding confidence degree can be calculated for a specific category using a maximum entropy model. Confidence degrees are calculated for respective categories using a machine learning technique in some embodiments, because such a technique can utilize training query data with a certain scale to simulate a query behavior of the user and calculate and acquire a probability that the query data is categorized into a category. Upon presence of values of these features, a probability that the current query data belongs to a category can be calculated according to the conditional probability model.

A transmit module 804 is adapted to return the respective categories and the corresponding confidence degrees to the client.

It is assumed that there are actually 40 categories for each of which a confidence degree is calculated, thus actually 40 corresponding confidence degrees are calculated, and the search engine server returns the respective categories and the corresponding confidence degrees to the user, so that the user can determine a search scope according to a category of interest to him or her for more precise search of information on a product as needed.

A first search module 805 is adapted to search in one of the categories, selected by the client according to the confidence degrees, for the current query data.

The device described in the present embodiment can be integrated on a search engine server or connected as a separate entity with the search engine server. It shall further be noted that when the method according to the application is implemented in software, it can be implemented as a new function added to the search engine server or written separately in corresponding program, and the application will not be limited in respect of how to implement the method or device.

In the present embodiment, the device can search in one of the categories selected by the client for the current query data in the case of returning correspondence relationships between the confidence degrees and the categories to the client. Thus, it is possible to reduce a workload of the search engine server to some extent, to improve the operation efficiency and performance of the search engine server and to improve a search experience of the user for a data query.

Figure 9:
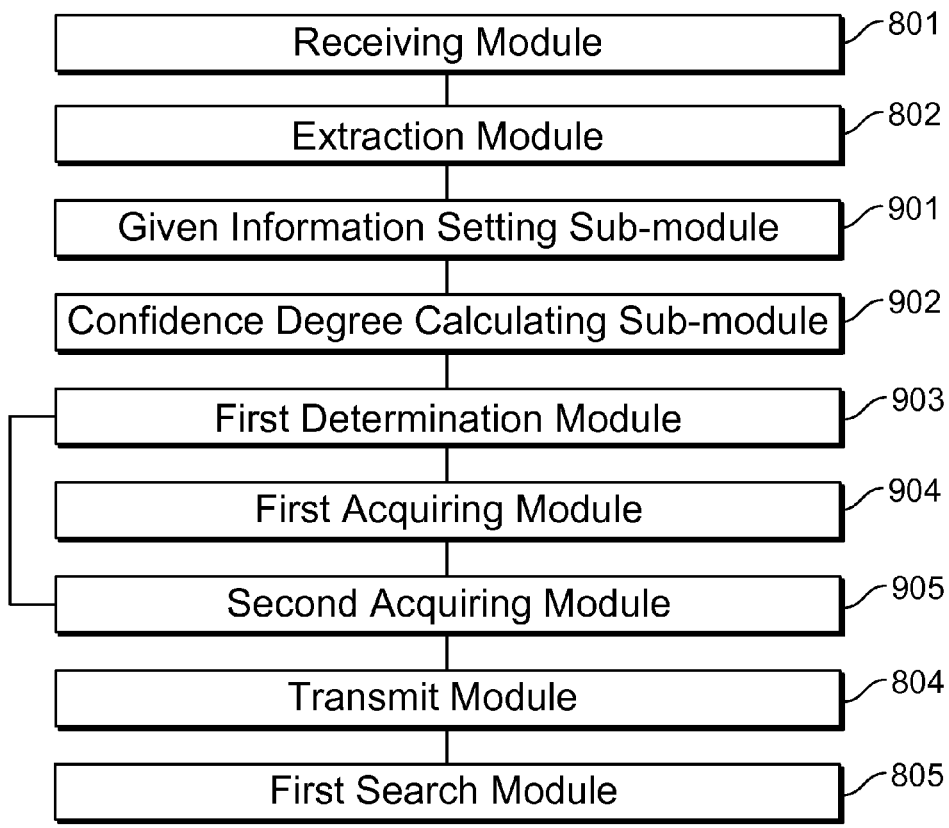
FIG. 9 is a block diagram illustrating another embodiment of a search system.

FIG. 9 is a block diagram illustrating another embodiment of a search system.

In this example, system 900 includes a receiving module 801 adapted to receive current query data submitted from a client, and an extraction module 802 adapted to extract a word-level feature, a syntax feature, a semantic feature, a click feature, a selection feature, and a session feature of the current query data.

A given information setting sub-module 901 is adapted to set the word-level feature, the syntax feature, the semantic feature, the click feature, the selection feature, and the session feature as given information of a conditional probability model.

A confidence degree calculating sub-module 902 is adapted to calculate posterior probabilities that the current query belongs to the respective categories in case of the given information using the conditional probability model and to set the posterior probabilities as confidence degrees that the current query data belongs to the respective categories.

The conditional probability model can train the weights of the features obtained by the current query data and the conditional probabilities (i.e., confidence degrees) that the current query data is determined to belong to the respective categories are calculated from the obtained corresponding feature values and weights using the conditional probability model. In some embodiments, a maximum entropy model such as the one described above in connection with equation (1) is used. In other embodiments, the conditional probability model can be created from linear regression, a support vector machine model, etc.

A first determination module 903 is adapted to determine whether the respective calculated and acquired confidence degrees are above a preset first threshold.

After calculating and acquiring the confidence degrees that the current query data belongs to the respective categories, the query categorizer can preset a first threshold, and a category with a corresponding confidence degree above the threshold can be regarded as a category with a high degree of confidence.

A first acquiring module 904 is adapted to acquire those of the confidence degrees above the first threshold and their corresponding categories when a result from the first determination module is positive.

The query categorizer can return all of the confidence degrees above the first threshold and their corresponding categories to the client and present the confidence degrees in a descending order; or alternatively, the query categorizer can present the first predetermined number (e.g., 8) of confidence degrees and their corresponding categories on the client.

A second acquiring module 905 is adapted to acquire a predetermined number of relatively high confidence degrees from all the confidence degrees and their corresponding categories when all of the calculated and acquired confidence degrees of the respective categories are below the first threshold.

At the end of determination for all the confidence degrees, if none of the confidence degrees corresponding to the respective categories is above the first threshold, then the query categorizer can sort directly all the confidence degrees in a descending order and acquire a first predetermined number of relatively high confidence degrees and their corresponding categories.

The transmit module 804 is adapted to return the confidence degrees above the threshold and their corresponding categories or the respective categories and their confidence degrees to the client.

A first search module 805 is adapted to search in one of the categories, selected by the client according to the confidence degrees, for the current query data.

Figure 10:
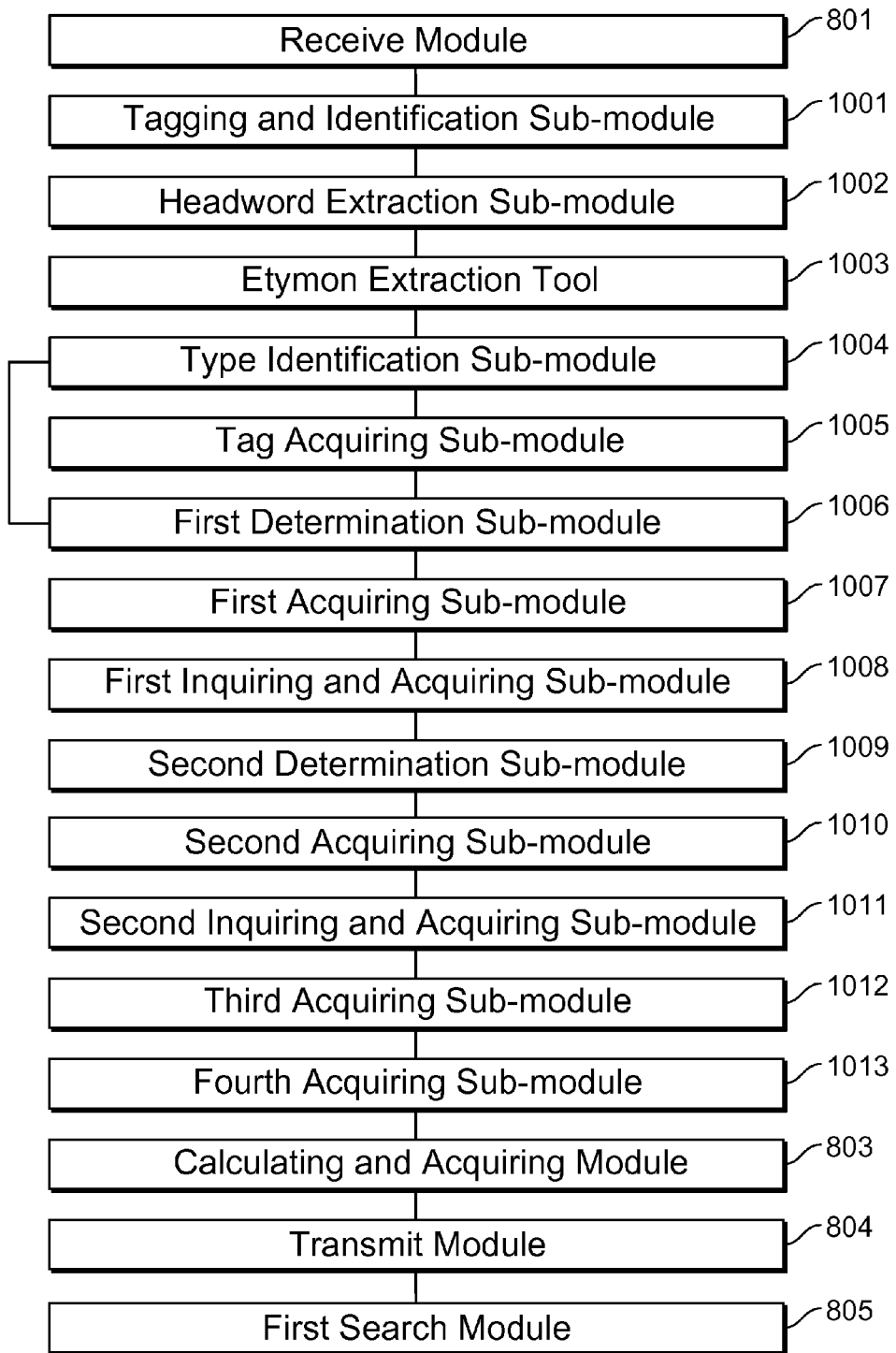
FIG. 10 is a block diagram illustrating another embodiment of a search system.

FIG. 10 is a block diagram illustrating another embodiment of a search system.

In system 1000, a receive module 801 is adapted to receive current query data submitted from a client. A tagging and identification sub-module 1001 is adapted to tag a part-of-speech of a keyword in the current query data and identify a phrase of the keyword in the current query data. Particularly, the part-of-speech can be tagged by a part-of-speech tagging tool, and the phrase can be identified by a phrase identification tool.

A headword extraction sub-module 1002 is adapted to acquire a noun phrase in the current query data from results of the foregoing tagging and identification and to extract the headword of the noun phrase.

An etymon extraction tool 1003 is adapted to extract the etymon of the headword.

A type identification sub-module 1004 is adapted to identify the type of the keyword of the current query data.

A tag acquiring sub-module 1005 is adapted to acquire an action verb tag, a product tag, a brand tag, a model tab, and/or another tag of the keyword according to the type identification.

A first determination sub-module 1006 is adapted to determine whether the current query data is present in a preset click log, where the preset click log is adapted to store a correspondence relationship between the query data and a click feature A first acquiring sub-module 1007 is adapted to acquire a first predetermined number of clicked categories corresponding to the current query data from the preset click log when a result of the first determination sub-module is positive, where the clicked categories are categories to which a corresponding products clicked on by a user after searching for the query data belong.

A first inquiring and acquiring sub-module 1008 is adapted to inquire in the click log about clicked query data closest to the current query data when a result of the first determination sub-module is negative, where the clicked query data is at the shortest edit distance in the click log from the current query data and to acquire a first predetermined number of categories corresponding to the clicked query data as click features of the current query data.

A second determination sub-module 1009 is adapted to determine whether the current query data is present in a preset selection log, where the selection log is adapted to store a correspondence relationship between the query data and a selection feature.

A second acquiring sub-module 1010 is adapted to acquire a first predetermined number of selected categories corresponding to the current query data from the preset selection log when a result of the second determination sub-module is positive, where the selected categories represent categories associated with the current query data in a mapping table of a search engine.

A second inquiring and acquiring sub-module 1011 is adapted to inquire in the selection log about selected query data closest to the current query data when a result of the second determination sub-module is negative, where the selected query data is at the shortest edit distance in the selection log from the current query data, and to acquire a first predetermined number of categories corresponding to the selected query data as selection features of the current query data.

A third acquiring sub-module 1012 is adapted to acquire the previous one piece of query data preceding the current query data in the same session A fourth acquiring sub-module 1013 is adapted to acquire a category to which an optimal categorizing result corresponding to the previous one piece of query data belongs and to set the category to which the optimal categorizing result belongs as a session feature of the current query data.

A calculating and acquiring module 803 is adapted to calculate and acquire confidence degrees of the current query data corresponding to the respective categories according to the word-level features, the syntax feature, the semantic features, the click features, the selection features, and the session feature, where each of the confidence degrees refers to a degree of confidence that the current query data belongs to one of the categories.

A transmit module 804 is adapted to return the respective categories and their corresponding confidence degrees to the client.

A first search module 805 is adapted to search in one of the categories, selected by the client according to the confidence degrees, for the current query data.

In the present embodiment, existing tools, e.g., a word segmentation unit, a part-of-speech tagging tool, etc., can be used to thereby reduce an implementation cost, and a high coverage rate thereof can be gained in a machine learning method based upon a conditional probability because confidence degrees of all possible related categories can be obtained from various extracted features using a conditional probability model regardless of whether the current query data has ever occurred, thus achieving wider applications and improved accuracy over the prior art table.

Figure 11:
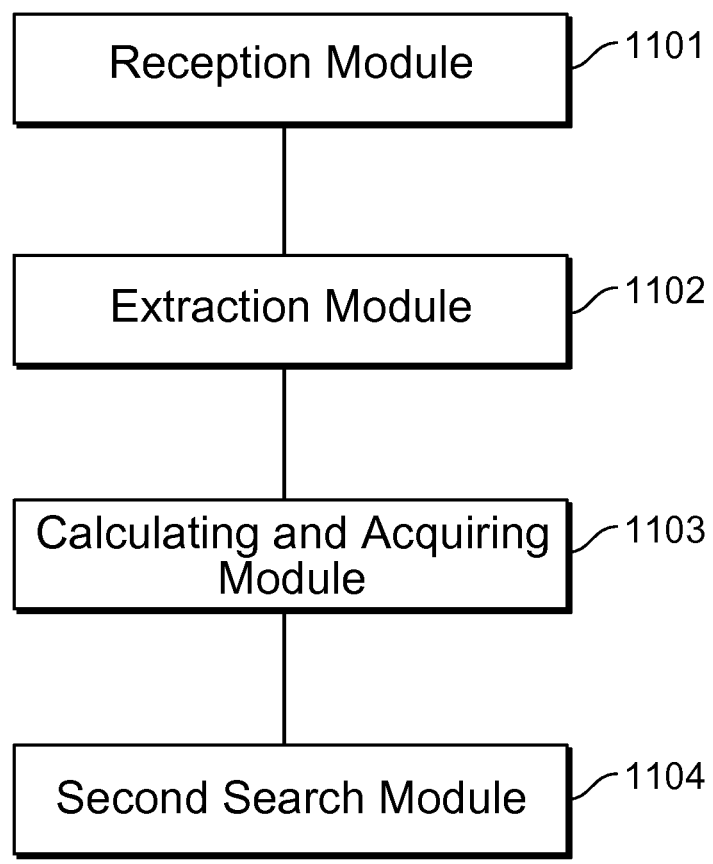
FIG. 11 is a block diagram illustrating another embodiment of a search system.

FIG. 11 is a block diagram illustrating another embodiment of a search system.

In system 1100, a receiving module 801 is adapted to receive current query data submitted from a client.

An extraction module 802 is adapted to extract generic attribute features of the current query data for calculating a confidence degree of the current query data.

A calculating and acquiring module 803 is adapted to calculate and acquire confidence degrees of the current query data corresponding to respective categories according to the generic attribute features, where each of the confidence degrees refers to a degree of confidence that the current query data belongs to one of the categories.

A second search module 1101 is adapted to search in one of the categories corresponding to the maximum one of the calculated confidence degrees for the current query data.

In the present embodiment, a difference from the first embodiment of the device lies in that after the calculating and acquiring module 803 calculates and acquires the confidence degrees that the current query data belongs to the respective categories, the search engine server can make determination, that is, determine one of the categories corresponding to the maximum one of all the calculated confidence degrees, and then search directly in that category for the current query data. Furthermore, a search result is returned directly to the user.

The device according to the present embodiment can perform a search directly according to an optimal result instead of returning the confidence degrees and their corresponding categories to the user, so that a demand of the user for a search result can generally be satisfied without storing any corresponding mapping table, etc., at the background to record information on the categories. Regardless of whether the current query data of the user has ever occurred, the maximum confidence degree that the current query data belongs to a category can be determined to thereby perform a search in that category as the most reasonable search operations, thus improving a coverage rate of the query data, optimizing the performance of the search engine server, and satisfying various search demands of the user.

In correspondence to the foregoing embodiments of the search method and device, the application further provides an embodiment of a search system, and in the present embodiment, the system can particularly include:

At a search engine server side:

A query categorizer includes a reception module, an extraction module, a calculating and acquiring module, and a transmit module.

The receiving module is adapted to receive current query data submitted from a client.

The extraction module is adapted to extract a word-level feature, a syntax feature, a semantic feature, a click feature, a selection feature, and a session feature of the current query data.

The calculating and acquiring module adapted to calculate and acquire confidence degrees of the current query data corresponding to respective categories according to the word-level feature, the syntax feature, the semantic feature, the click feature, the selection feature, and the session feature, where each of the confidence degrees refers to a degree of confidence that the current query data belongs to one of the categories.

The transmit module is adapted to return the respective categories and their corresponding confidence degrees to the client.

A first search module is adapted to search in one of the categories, selected by the client according to the confidence degrees, for the current query data.

It shall be noted that the system can further include a client adapted to receive and submit the user entered current query data to the search engine server through a browser.

The modules described in the embodiments above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipments, etc.) implement the methods described in the embodiments of the present invention. The modules may be implemented on a single device or distributed across multiple devices. The functions of the modules may be merged into one another or further split into multiple sub-modules.

It shall be noted that the respective embodiments in the specification have been described progressively, each of the embodiments has placed emphasis on its difference(s) from other embodiment(s) and their common or similar parts can be for mutual reference. For the embodiments of the device, they are substantially similar to the embodiments of the method and therefore have been described briefly, and for details thereof, reference can be made to those parts of the descriptions of the embodiments of the method.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for searching information, comprising:
   receiving current query data from a client;
   computing, using one or more processors, a plurality of confidence degrees associated with the current query data, wherein the plurality of confidence degrees respectively indicate a degree of confidence that the current query data is associated with a corresponding one of a plurality of categories;
   selecting, using one or more computer processors, a category based at least in part on the plurality of confidence degrees and a mapping of at least part of the query data to one or more of the plurality of categories, the mapping being stored in a selection log that stores mappings of data associated with previous queries and previously selected categories corresponding to the respective previous queries, wherein the selected category is one of the plurality of categories and having a confidence degree higher than a confidence degree of another category, and wherein the selecting of the category comprises:
      determining whether the selection log comprises one or more entries matching the current query data;
      in the event that the selection log is determined to not comprise the one or more entries matching the query data, determining one or more closest categories relative to the current query data; and
      deeming the one or more closest categories as the selected category;
   in response to selecting the category based at least in part on the plurality of confidence degrees, searching in the selected category for a search result that corresponds to the current query data; and
   returning the search result to the client.

2. The method of claim 1, further comprising: extracting generic attribute features of the current query data, wherein the generic attribute features are used for computing the plurality of confidence degrees of the current query data.

3. The method of claim 2, wherein the generic attribute features comprise a word-level feature that corresponds to a keyword in the current query data.

4. The method of claim 2, wherein the generic attribute features comprise a syntax feature that corresponds to an etymon corresponding to a headword in the current query data.

5. The method of claim 4, wherein extracting the generic attribute features including the syntax feature comprises:
   performing part-of-speech tagging of a keyword in the current query data and identifying a phrase including the keyword in the current query data;
   obtaining a noun phrase in the current query data based at least in part on results of the part-of-speech tagging and the identification of the phrase;
   extracting the etymon associated with the headword of the noun phrase.

6. The method of claim 2, wherein the generic attribute features comprise a semantic feature that corresponds to a semantic tag corresponding to the keyword.

7. The method of claim 6, wherein extracting the generic attribute features including the semantic feature comprises:
   identifying a type of the keyword of the current query data; and
   acquiring an action verb tag, a product tag, a brand tag, a model tab, or another tag of the keyword according to the identified type.

8. The method of claim 2, wherein the generic attribute features comprise a click feature that corresponds to a clicked category corresponding to the current query data in a click log.

9. The method of claim 8, wherein extracting the generic attribute features including the click feature comprises:
   determining whether the current query data is present in the click log, wherein the click log is adapted to store a correspondence relationship between the query data and the click feature;
   in the event that the current query data is present in the click log, acquiring a first predetermined number of clicked categories corresponding to the current query data from the selection log, wherein the clicked categories are categories to which a corresponding product clicked by a user after searching for the query data belongs; and
   in the event that the current query data is not present in the click log, inquiring in the click log about clicked query data closest to the current query data, wherein the clicked query data is at the shortest edit distance in the click log from the current query data, and acquiring the first predetermined number of categories corresponding to the clicked query data as the click feature.

10. The method of claim 2, wherein the generic attribute features comprise a selection feature that corresponds to at least a selected category corresponding to the current query data in a selection log.

11. The method of claim 10, wherein extracting the generic attribute features including the selection feature comprises:
    determining whether the current query data is present in the selection log, wherein the selection log is adapted to store a correspondence relationship between the query data and the selection feature;
    in the event that the current query data is present in the selection log, acquiring a first predetermined number of selected categories corresponding to the current query data from the selection log, wherein the selected categories represent categories associated with the current query data in a mapping table of a search engine; and
    in the event that the current query data is not present in the selection log, inquiring in the selection log about selected query data closest to the current query data, wherein, the selected query data is at the shortest edit distance in the selection log from the current query data, and acquiring the first predetermined number of categories corresponding to the selected query data as selection features of the current query data.

12. The method of claim 2, wherein the generic attribute features comprise a session feature that corresponds to a substantially optimal category corresponding to a previous one query preceding the current query data in the same session.

13. The method of claim 12, wherein extracting the generic attribute features including the session feature comprises:
    acquiring preceding query data that precedes the current query data in the same session;
    acquiring a category to which an optimal categorizing result corresponding to the preceding query data belongs; and
    setting the category to which the optimal categorizing result belongs as a session feature of the current query data.

14. The method of claim 1, further comprising determining the plurality of confidence degrees of the current query data based at least in part on the generic attribute features, wherein the determining of the plurality of confidence degrees of the current query data includes:
    setting the generic attribute features as given information of a conditional probability model;
    calculating a plurality of posterior probabilities that the current query belongs to the respective categories under condition of the given information using the conditional probability model; and
    setting the plurality of posterior probabilities as the plurality of confidence degrees.

15. The method of claim 1, further comprising:
    identifying selected ones of the plurality of confidence degrees that meet a preset first threshold and their corresponding categories; and
    returning the selected ones of the plurality of confidence degrees and their corresponding categories to the client for selecting the selected category for the current query data.

16. The method of claim 1, wherein the selected category is chosen by a user.

17. The method of claim 1, wherein the selected category has a maximum calculated confidence degree for the current query data.

18. The method of claim 1, wherein the one or more categories relate to a respective one or more industry categories in which a product associated with a generic attribute feature belongs.

19. The method of claim 1, wherein the selecting of the category based at least in part on a plurality of confidence degrees comprises:
    selecting a plurality of categories based at least in part on the plurality of confidence degrees;
    providing the plurality of categories to a user; and
    receiving an indication from the user of a selection of one of the plurality of categories,
    wherein the searching in the selected category for the search result comprises searching in the category corresponding to indication of the selection received from the user.

20. The method of claim 1, wherein the selecting of the category based at least in part on a plurality of confidence degrees comprises:
    selecting one or more categories based at least in part on whether the one or more categories are included on a selection log relating to the current query data.

21. A system for searching information, comprising:
    one or more processors configured to:
        receive current query data from a client;
        computing a plurality of confidence degrees associated with the current query data, wherein the plurality of confidence degrees respectively indicate a degree of confidence that the current query data is associated with a corresponding one of a plurality of categories;
        select a category based at least in part on the plurality of confidence degrees and a mapping of at least part of the query data to one or more of the plurality of categories, the mapping being stored in a selection log that stores mappings of data associated with previous queries and previously selected categories corresponding to the respective previous queries, wherein the selected category is one of the plurality of categories and having a confidence degree higher than a confidence degree of another category, wherein to select the category comprises:
            determining whether the selection log comprises one or more entries matching the current query data;
            in the event that the selection log is determined to not comprise the one or more entries matching the query data, determining one or more closest categories relative to the current query data; and
            deeming the one or more closest categories as the selected category;
        in response to selecting the category based at least in part on the plurality of confidence degrees, search in the selected category for a search result that corresponds to the current query data; and
        return the search result to the client; and
    one or more memories coupled to the one or more processors, configured to provide the processors with instructions.

22. A computer program product for searching information, the computer program product being embodied in a tangible non-transitory computer readable storage medium and comprising computer instructions for:

causing at least one processor to receive current query data from a client;

causing at least one processor to compute a plurality of confidence degrees associated with the current query data, wherein the confidence degrees respectively indicate a degree of confidence that the current query data is associated with a corresponding one of a plurality of categories;

causing at least one processor to select a category based at least in part on the plurality of confidence degrees and a mapping of at least part of the query data to one or more of the plurality of categories, the mapping being stored in a selection log that stores mappings of data associated with previous queries and previously selected categories corresponding to the respective previous queries, wherein the selected category is one of the plurality of categories and having a confidence degree higher than a confidence degree of another category, wherein to select the category comprises:

determining whether the selection log comprises one or more entries matching the current query data;

in the event that the selection log is determined to not comprise the one or more entries matching the query data, determining one or more closest categories relative to the current query data; and deeming the one or more closest categories as the selected category;

causing at least one processor to search in the selected category for a search result that corresponds to the current query data in response to the category being selected based at least in part on the plurality of confidence degrees; and causing at least one processor to return the search result to the client.

23. The method of claim 1, wherein the one or more closest categories are determined based at least in part on a cost of operations required to match the current query data.

* * * * *